United States Patent  
Hoffmann et al.

(10) Patent No.: US 11,738,460 B2
(45) Date of Patent: Aug. 29, 2023

(54) SYSTEM

(71) Applicant: SICK AG, Waldkirch (DE)

(72) Inventors: Christoph Hoffmann, Waldkirch (DE);
Patrick Erlewein, Waldkirch (DE);
Axel Schonhardt, Waldkirch (DE)

(73) Assignee: SICK AG, Waldkirch (DE)

( * ) Notice: Subject to any disclaimer, the term of this patent is extended or adjusted under 35 U.S.C. 154(b) by 134 days.

(21) Appl. No.: 17/192,266

(22) Filed: Mar. 4, 2021

(65) Prior Publication Data
US 2021/0276193 A1   Sep. 9, 2021

(30) Foreign Application Priority Data

Mar. 6, 2020  (DE) .......................... 102020106161.7

(51) Int. Cl.
*G05B 19/04* (2006.01)
*G05B 19/18* (2006.01)
(Continued)

(52) U.S. Cl.
CPC ......... *B25J 9/1676* (2013.01); *B25J 15/0019* (2013.01); *B25J 15/045* (2013.01)

(58) Field of Classification Search
CPC .... B25J 9/1676; B25J 15/0019; B25J 15/045; B25J 19/021; B25J 9/1674; B25J 19/06;
(Continued)

(56) References Cited

U.S. PATENT DOCUMENTS

| 11,279,035 B1* | 3/2022 | Polido ..................... G01S 17/42 |
| 2015/0039122 A1* | 2/2015 | Barakchi Fard ....... G05B 19/19 |
| | | 700/186 |

(Continued)

FOREIGN PATENT DOCUMENTS

DE   102013020596 A1   6/2015
DE   102015121262 A1   6/2016
(Continued)

OTHER PUBLICATIONS

The robot eye with an all-around field of view, Fraunhofer, pp. 1-3, Oct. 2018.
(Continued)

*Primary Examiner* — Harry Y Oh
(74) *Attorney, Agent, or Firm* — Nath, Goldberg & Meyer; Jerald L. Meyer

(57) ABSTRACT

A system having a sensor system comprising distance sensors for monitoring a hazardous zone at a movable machine part having at least one protected zone, wherein a tool is arranged at the movable machine part, wherein the distance sensors are arranged at a holder at the movable machine part, wherein a plurality of distance sensors are arranged, with the detection beams of the distance sensors forming a protected field shell, wherein the holder has the distance sensors, with the holder having a disk-shaped housing, with the disk-shaped housing having round surfaces and not having any corners at the outer surfaces, with the system comprising a fastening system, the fastening system comprises one of a first fastening adapter and a second fastening adapter at which the holder is respectively arranged for fastening the holder to the movable machine part.

10 Claims, 6 Drawing Sheets

Figure 1:
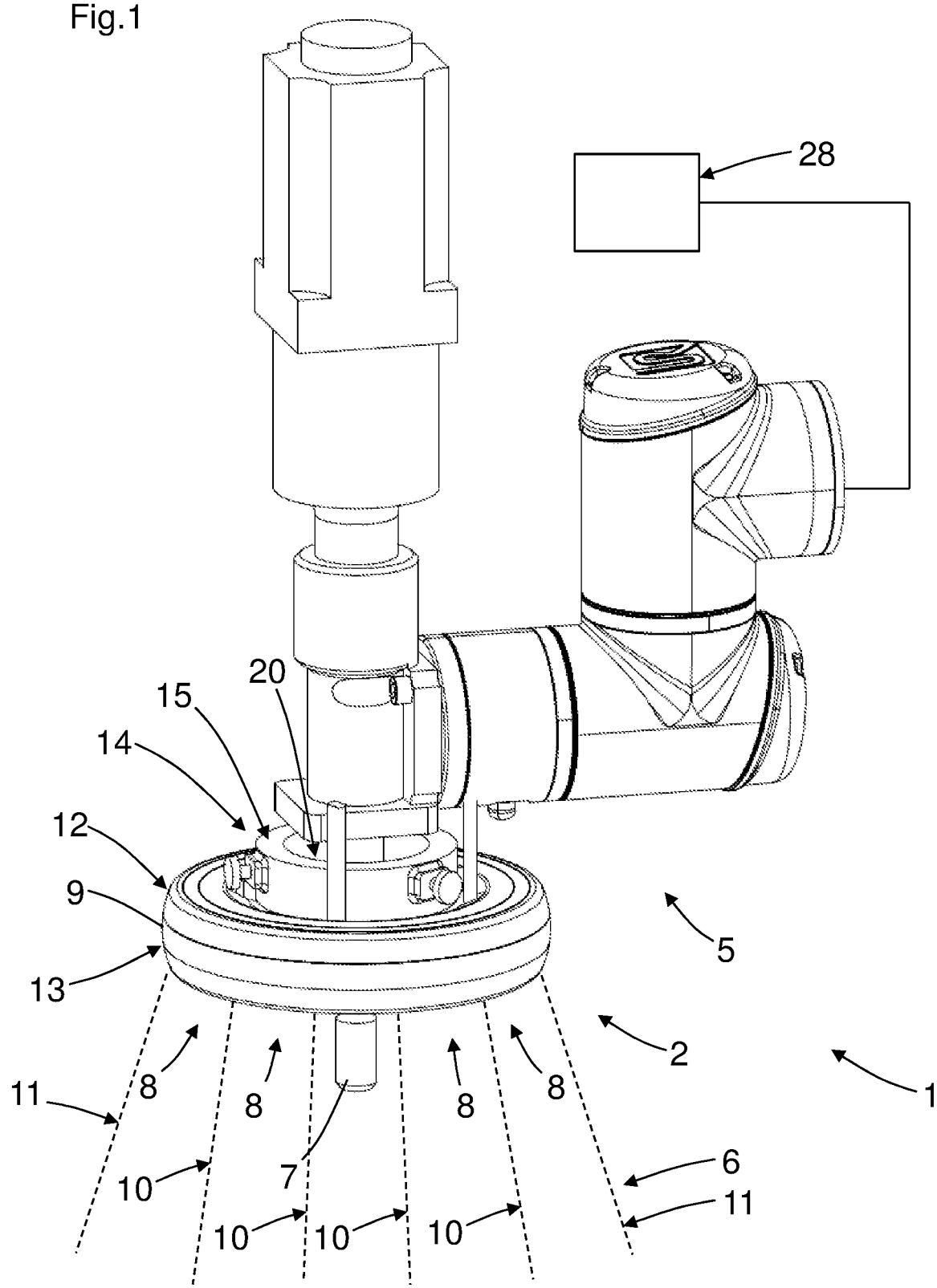

(51) Int. Cl.
*B25J 9/16* (2006.01)
*B25J 15/00* (2006.01)
*B25J 15/04* (2006.01)

(58) Field of Classification Search
CPC ........... G05B 2219/40202; G05B 2219/40203; G05B 2219/49137; F16P 3/144; F16P 3/14

See application file for complete search history.

(56) References Cited

U.S. PATENT DOCUMENTS

| | | | |
|---|---|---|---|
| 2015/0294496 A1* | 10/2015 | Medasani | G06T 15/205 345/420 |
| 2017/0030708 A1* | 2/2017 | Albert | G01S 17/87 |
| 2019/0277944 A1* | 9/2019 | Ning | G01S 5/30 |
| 2021/0178607 A1* | 6/2021 | Saadat | B25J 15/0616 |

FOREIGN PATENT DOCUMENTS

| | | | | |
|---|---|---|---|---|
| DE | 102015112656 | A1 | 2/2017 | |
| DE | 102018113359 | A1 | 12/2019 | |
| EP | 3415286 | A1 | 5/2018 | |
| EP | 3533568 | A1 | 12/2018 | |
| EP | 3578324 | A1 | 5/2019 | |
| EP | 3578324 | B1 * | 9/2020 | ............ B25J 19/021 |
| WO | 2019042784 | A1 | 3/2019 | |

OTHER PUBLICATIONS

Office Action dated Oct. 1, 2020 issued in corresponding German Application No. 102020106161.7.

* cited by examiner

SYSTEM

The present invention relates to a system having a sensor system comprising distance sensors.

DE 10 2015 112 656 A1 discloses a plurality of optoelectronic distance sensors at a movable machine part.

Functions are resulting more and more in today's production environment in which humans have to work hand in hand with robots in close spaces. Protection of a human from the robot is in this respect not possible by mechanical protective devices such as fences or barriers, but must rather be transposed into the direct environment of the robot.

To make this kind of working together possible in principle, robot manufacturers have developed robots having a performance and force limitation. The maximum force a robot can exert before the movement is automatically stopped can be set here such that a force effect cannot produce serious injury in the event of a collision of the robot with a person. The motor control and the rotary encoders which carry out a positional determination of the robot arm are safety components with corresponding certification.

In addition, when designing the mechanical robot components, care is deliberately taken to provide edge-free, round or soft external contours so that a possible collision force is distributed over as large a surface as possible and so that no danger of lacerations or the like can occur.

An increasing prevalence of safe small robots having safe movement controls and power-limited drives reduces the sources of danger to the tool attachment at the end of the robot arm. A problem which has not yet been solved satisfactorily in this respect is the securing of the tool at the robot per se. The tool itself frequently comprises sharp or pointed parts, parts which rotate or which are hot, etc. in order to be able to carry out its function at all. Examples include drills, screws, cutters, blades, grippers having sharp edges for filigree parts, welding guns, soldering tips, etc.

There is thus an increased risk of injury at the tool, even with a safe force limitation of the robot due to the movement of the tool or of parts having sharp edges. Even blunt tools can represent a danger in a sharp-edged working area or environmental area. A tool attachment typically has small dimensions and is well localized. At the same time, the great variety of possible tool geometries, the fast movement in a number of degrees of freedom, and the demand for fast fitting and changing geometries of the tool attachment represent new demands on a securing solution which existing safety sensors cannot satisfy or can only meet unsatisfactorily.

Robots are not finished machines since they are delivered without tools. Intrinsically safe HRC robots also do not receive a CE mark for this reason. Safety sensors characterized as ESPE can be used to secure a robot including tool and workpiece. These sensors have to be fastened to the robot.

It is an object of the invention to provide an improved system having a sensor system.

The object is achieved in accordance with by a system having a sensor system. Such a system comprises distance sensors and a control and evaluation unit for monitoring a hazardous zone at a movable machine part having at least one protected zone, wherein a tool is arranged at the movable machine part, wherein the distance sensors are arranged at a holder, wherein a plurality of distance sensors are arranged, with the detection beams of the distance sensors forming a protected field shell, wherein the holder has the distance sensors, with the holder having a disk-shaped housing, with the disk-shaped housing having round surfaces and not having any corners at the outer surfaces, with the system comprising a fastening system, wherein the fastening system comprises a first fastening adapter at which the holder is arranged for fastening the holder to the tool, wherein the first fastening adapter has a central continuous opening for the tool or the fastening system comprises a second fastening adapter at which the holder is arranged for fastening the holder to the movable machine part, with the second fastening adapter having two limbs that are arranged at a right angle to one another, and with the holder being fastened to the first limb and the second fastening adapter being connected to the movable machine part at the second limb.

The holder having the distance sensors forms an end of arm safeguarding (EOAS).

The fastening system is preferably fixed to the last axis of a robot. The fastening system thus has a defined orientation or a defined angle with respect to the last axis.

A longitudinal axis of the tool is preferably arranged at an angle of 90° to a last axis of the movable machine part.

In accordance with the invention, the tool is secured in the application. A direct collaboration of human and robot, incl. tools, is thereby possible. The throughput time is thereby increased, work safety is increased, and much less space is taken up for the safeguarding since only the direct hazard area is secured.

The disk-shaped housing has round surfaces and no corners at the outer surfaces.

There is a fastening system for the holder and thus for the distance sensors here that represents a flexible solution for application-specific demands. An adapter function for different robot flanges and end effectors is in particular provided by the fastening system or the fastening adapters here. In addition, the sensor system having the disk-shaped housing with the fastening structure is inherently safe in form and material and is mechanically stable to prevent manipulations of the safety devices, on the one hand, and to forward forces to an optionally power and force limited robot, on the other hand.

Due to the round surface of the disk-shaped housing, a possible collision surface is present at every point and actually no collision edge or collision corner, whereby a risk of injury is minimized. The outer contours of the disk-shaped housing are here optionally rounded, also circular or arcuate.

The system does not have any sharp edges. An organic shape is rather provided that has the effect of small surface pressure on contact. The design has no gaps in which the fingers or clothing of the worker could catch.

The cable guides and/or tube feeds are also designed as inherently safe so that they have no corners and are formed as yielding on a force effect. The cable guides and/or tube feeds are in particular guided in a tight fashion to avoid a catching of the human hand.

The holder that receives the distance sensors can be monolithic or modular.

The holder and the mount for the distance sensors are fixedly connected to the fastening adapters so that they do not release from the fastening adapters on a blow between the human and the holder. Forces can thus be forwarded to the robot. The mechanical design is designed as so stable that forces can be forwarded to the robot and to its power and force limitation.

The sensor system serves for the safe monitoring of the hazardous zone or of a monitored zone of the movable machine part.

In accordance with the present invention, safety is safety in the sense of machine safety. The standard EN/IEC 61496, for example, regulates the demands on a safe sensor or on electro-sensitive protective equipment (ESPE) for securing hazardous zones. Machine safety is regulated in the standard EN 13849. The safety is, for example, ensured by a single-channel design with testing, a two-channel design, or a design diverse in two channels of a control and evaluation unit for error localization and for a functional test. The distance measuring sensor or distance sensor in accordance with the present invention is designed, for example, as intrinsically safe and recognizes internal defects. An error signal is generated, for example, on discovery of a defect. The sensor or distance sensor furthermore optionally has a sensor testing.

The control and evaluation unit recognizes protected field infringements and can output a safety directed switch-off signal to stop a dangerous movement of the part or to brake the part. This can e.g. be implemented via safe switching signals, e.g. OSSD signals (output safety switching device signals) or safe distance data, spacing data or safe spatial data of the intrusion event. For example, the control and evaluation unit is configured with two channels.

The plurality of distance sensors are connected to the control and evaluation unit for evaluating the distance sensors.

The distance sensors are optionally arranged spaced apart from one another along a ring, with the sensors forming an areal protected field shell that extends, for example, cylindrically or frustoconically.

The distance sensors optionally have uniform spacings. An almost uniform resolution within the protected field is achieved by the uniform spacings of the sensors and a respective identical angular orientation of the detection beams.

The sensors are contactlessly acting distance measuring sensors, with the sensors having a detection beam for detecting objects in the monitored zone. The distance sensors are preferably optoelectronic distance sensors.

The distance sensors can each have a linear or areal protected field. The areal protected field is formed in fan shape with a specific opening angle of, for example, 2° to 20°.

The monitoring takes place using a plurality of simple distance measurement sensors sensing in one dimension.

The distance sensors are time of flight sensors, for example. A time of flight sensor or a distance sensor or a light scanner in accordance with the time of flight principle has at least one light transmitter which transmits consecutive light pulses into a measurement zone and has at least one light receiver which receives the light pulses reflected at an object in the measurement zone and supplies them in the form of received electrical signals to a control and evaluation unit which determines a distance signal representative of the distance of the object from the light sensor while taking account of the speed of light from the time between transmission and reception of the light pulse.

A modular design of the holder is likewise provided. A submodule of the holder here only includes a limited number of distance sensors. Any desired securing contours can thus be produced by a combination of different submodules.

An adaptation of the number of sensors is provided to generate a more or less closed protected field shell from the distance sensors: The number of sensors can be changed, for example. The more distance sensors are arranged, the closer the optical axes of the distance sensors are next to one another, whereby the protected field shell has a higher resolution.

The wavelength of the transmitted light of the distance sensors is preferably a wavelength invisible to the human eye, for example infrared light. A direct intrusion into possible protection gaps is thereby made more difficult since they are not visible.

Mounts of the holder for the distance sensors have at least one mechanical fastening for the distance sensors at which the distance sensors can be mounted in at least one predefined position.

The holder or a mount in the holder is implemented such that all the distance sensors have a fixed relative position with respect to one another that is compatible with the securing concept.

The distance sensors are optionally installed per poka-yoke, according to which the sensors automatically have to necessarily be installed in the correct position.

The mount is optionally implemented such that a plurality of orientations of the individual distance sensors are possible that are each compatible with the securing concept.

The position and alignment of the individual ESPE sensors can no longer be recognized by the worker in the finally installed state so that a manipulation is thereby made more difficult.

The holder optionally has mounts for circuit boards, electronic assemblies and/or cable connections.

The holder can simultaneously serve as a mount for further electronic assemblies such as cable collector boards, logic units for the first data processing and/or further sensors.

The cable guide is designed here such that the user or worker cannot get caught in the cables.

The holder optionally provides strain relief for the cables of the distance sensors.

The fastening system is configured such that no manipulation is possible due to the fastening mechanism. I.e. the holder or the EOAS (end of arm safeguarding) has to be installed first, then the tool. The fastening system is designed such that the holder can only be removed after dismantling the tool.

The fastening system is configured such that the tool is vertically adjustable relative to the holder or to the EOAS. The protected field shell can thereby always be adapted to the application and to the dimensions of the tool and workpiece. The technical limits of the EOAS and the safety of the application can thus be aligned with one another.

The fastening system is designed such that the tool can be easily replaced. This can preferably also be done in ongoing operation, that is, for example, during a work cycle, when the tool is stationary, or is moving at a non-dangerous movement speed.

The fastening system is designed such that the tool does not slide in position and location after installation since the position of the tool length to the protected field shell has to remain ensured.

The fastening system is configured such that a strain relief of cables and lines is provided at the fastening system.

The first and/or second fastening adapter(s) is/are, for example, composed of steel, in particular stainless steel. However, fastening adapters of plastic can also be provided.

In a further development of the invention, the first fastening adapter or the second fastening adapter are screwed to the holder by means of a single screw connection, with the screw connection having a diameter that is greater than the central continuous opening for the tool.

The holder can be installed very fast due to the single screw connection. Since the diameter has a size that is greater than the central continuous opening for the tool, the screw connection can surround the central opening and the screw connection can, for example, be released and fastened or fixed by the hand alone.

In a further development of the invention, the first fastening adapter has an annular fastening unit, with the annular fastening unit surrounding the central opening and with fastening means being symmetrically arranged at the annular fastening unit.

A central axis of the first fastening adapter can thereby be arranged congruent with a central axis of the tool. The tool is here arranged centrally to the first fastening adapter and centrally to the holder.

In a further development of the invention, the first limb of the second fastening adapter has an opening for the tool.

A central axis of the opening of the first limb of the second fastening adapter can thereby be arranged congruent with a central axis of the tool. The tool is here arranged centrally to the opening of the first limb of the second fastening adapter and centrally to the holder.

In a further development of the invention, the first limb and the second limb each have fastening holes.

The holder can thereby be easily fastened to the first limb, for example by means of installation screws, and the second limb of the second fastening adapter can, for example, be connected to the movable machine part by means of installation screws.

In a further development of the invention, the first limb and the second limb are each round at the ends—

Due to the round surface of the ends, no sharp edges or corners are present, whereby a risk of injury is minimized. The outer contours of the limbs are here optionally circular or arcuate.

The design exposed to the worker may not have any sharp edges. An organic shape is rather provided that has the effect of small surface pressure on contact. The design the worker is exposed to does not have any gaps in which the fingers or clothing of the worker could catch.

In a further development of the invention, a material supply device is arranged at and fastened to the fastening system.

The fastening system is configured such that applications can be implemented with and output a supply of installation parts. In screw applications, it may e.g. occur that screws are delivered to the installation site by a supply along the tool, for example along a screw tool.

The fastening system is configured such that the supply does not interfere with or shadow the protected field shell. The material supply device is here, for example, guided within the holder, that is not by the protected field shell, or the material supply device is guided, for example, between two detection beams close to the origin of the detection beams, whereby the protected field shell is likewise not impaired or shadowed.

In a further development of the invention, the tool is an installation tool, a screw tool, a bonding tool, a cleaning tool, a drilling tool, a milling tool, a grinding tool, or a deburring tool.

Such tools can thereby be used in an automated manner, whereby a manual application is no longer required. A degree of automation can thereby be substantially increased.

In a further development of the invention, the system comprises a control and evaluation unit, with the distance sensors being connected to the control and evaluation unit, with first detection beams of the distance sensors forming the protected field shell and second detection beams of the distance sensors forming a warning field shell, with the warning field shell sheathing the protected field shell.

The outer warning field shell results in a weaker safety measure on an intervention such as an alarm or a certain reduction of speed and only the inner protected field shell acts as a protected field with a genuine safeguarding by stopping, evading, or by a great reduction of the speed of the tool. The availability of the system is thereby increased.

In a further development of the invention, the control and evaluation unit is configured to vary a movement speed of the movable machine part, with the movement speed being slowed on an intervention in the warning field shell and being stopped on an intervention in the protected field shell. The availability of the system is thereby increased.

In a further development of the invention, the control and evaluation unit is configured to only activate the tool when a minimum distance is present between the tool and a workpiece, with the minimum distance being based on anthropometric data.

In a further development of the invention, the control and evaluation unit is configured to only activate the tool when a minimum distance is present between the tool and a workpiece, with the minimum distance amounting to 10 mm to 20 mm.

In a further development of the invention, the control and evaluation unit is configured to only activate the tool when a minimum distance is present between the tool and a workpiece, with the minimum distance amounting to 14 mm.

The system or the control and evaluation unit is configured for the purpose that the protected field shell is configured such that on an approach to a process point, for example the point at which the screw is installed, the movable machine part or the robot becomes slower on an intervention in the warning field shell or stops on an intervention in the protected field shell.

The system or the control and evaluation unit is configured for the purpose that the protected field shell is configured such that the tool and the robot are switched off or stopped in the case of an intervention. The tools are in particular only actuated (e.g. rotating the screw head/drill or the deburrer, actuating the adhesive nozzle, etc.) when the distance between the tool tip and the surface to be machined is smaller than a minimum distance. This minimum distance is coupled to anthropometric data. If the injury to/crushing of a finger is to be avoided, for example, the tool may only be actuated when the distance is smaller than 14 mm, in accordance with the standard EN349.

Figure 2:
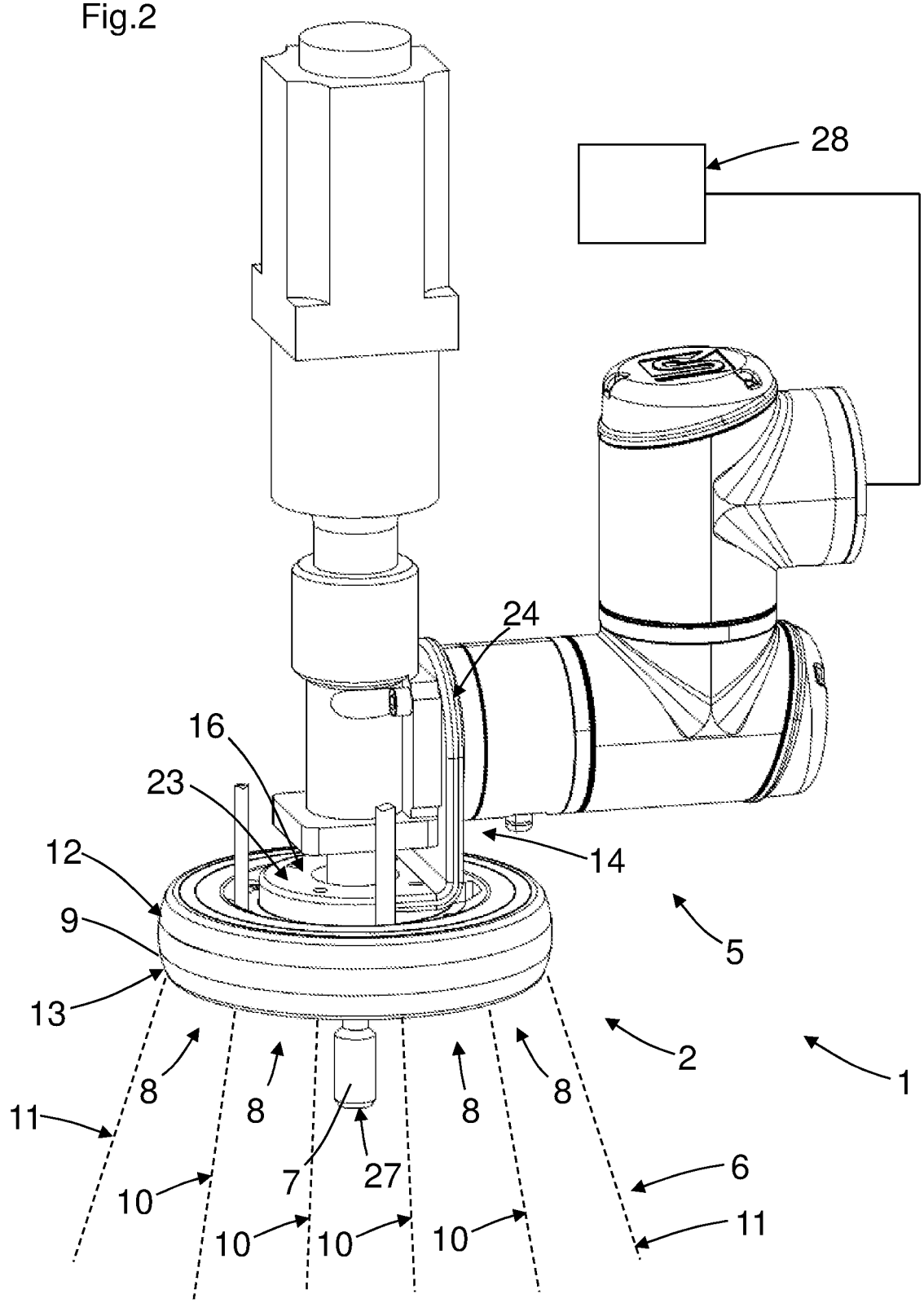
Figure 3:
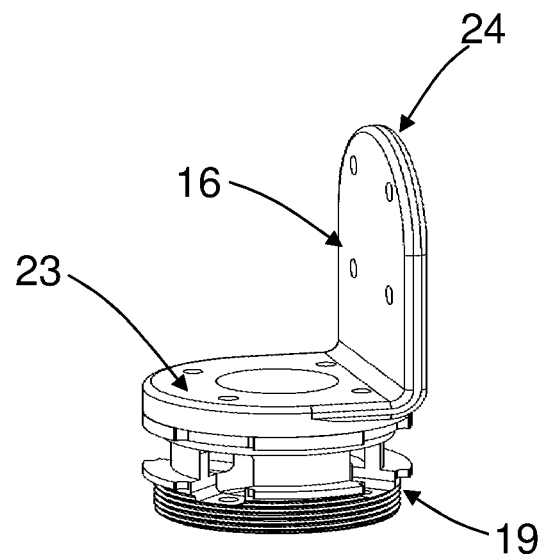
Figure 4:
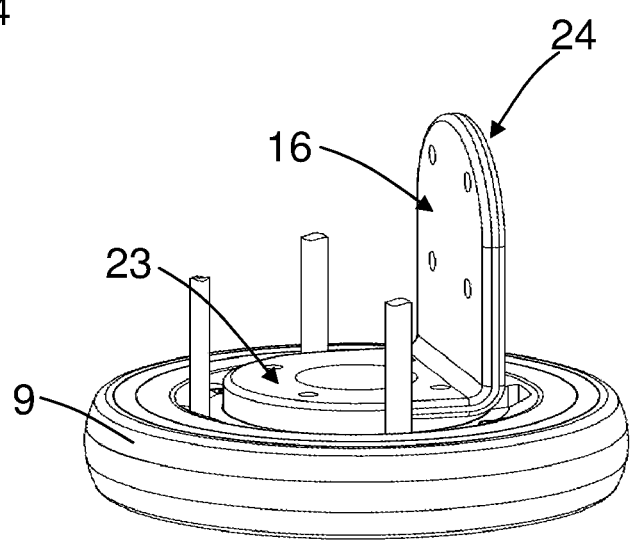
Figure 5:
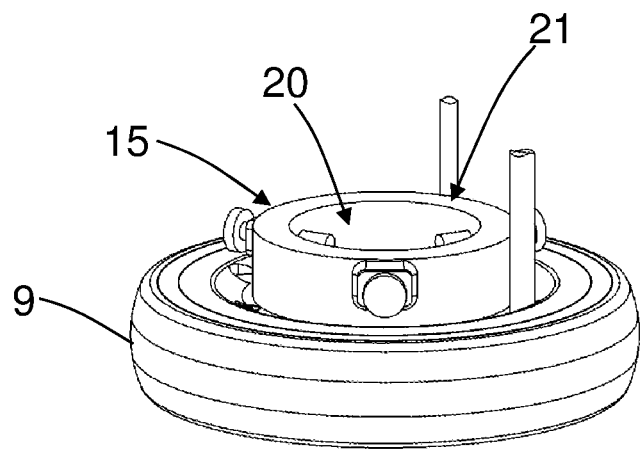
Figure 6:
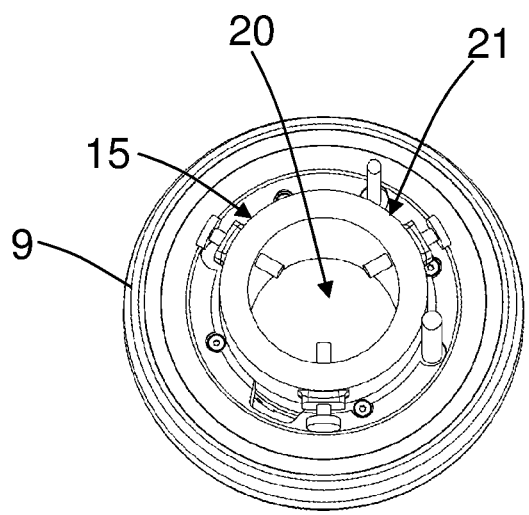
Figure 7:
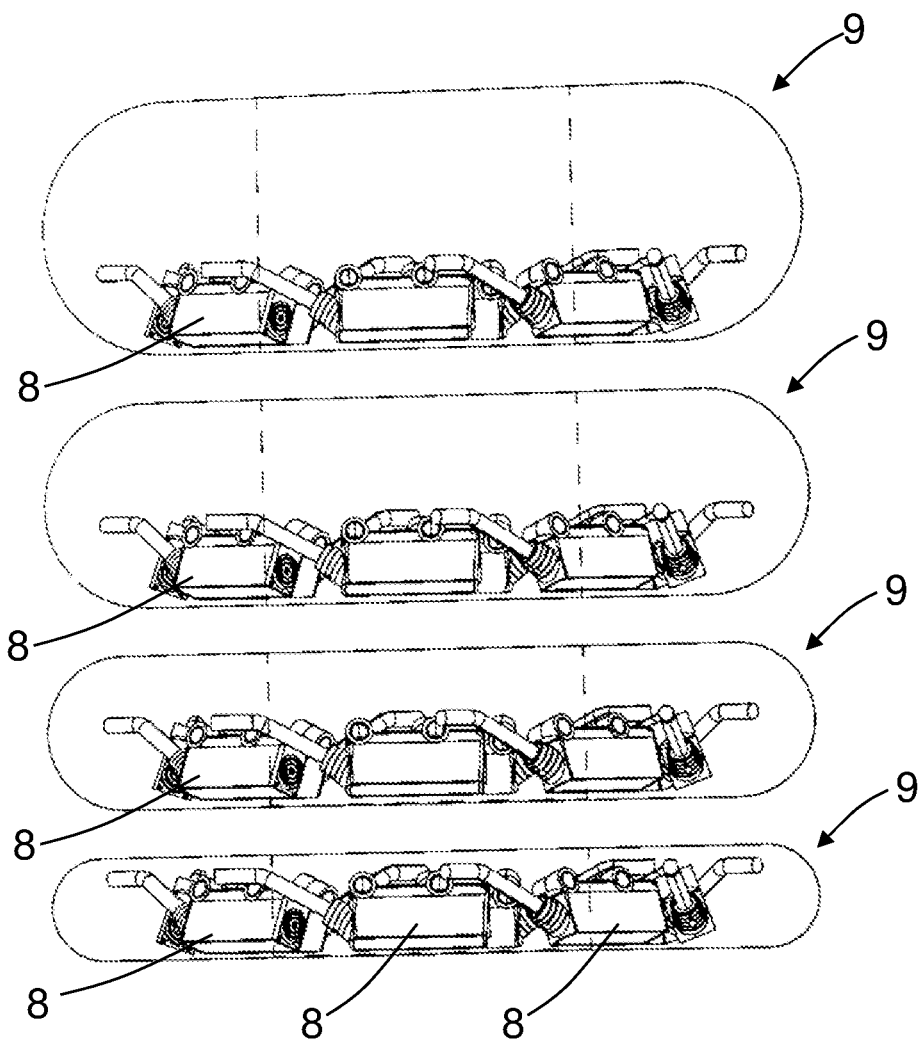
Figure 8:
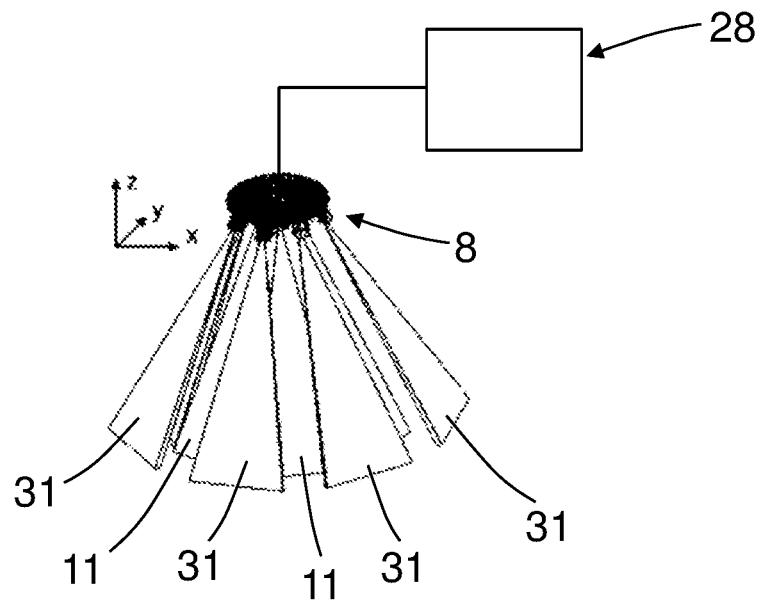
Figure 9:
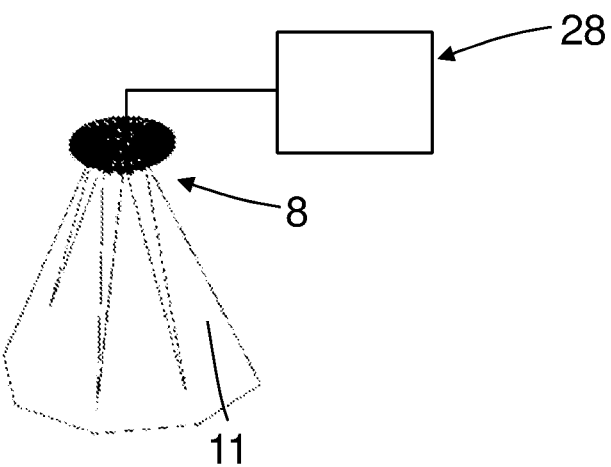
Figure 10:
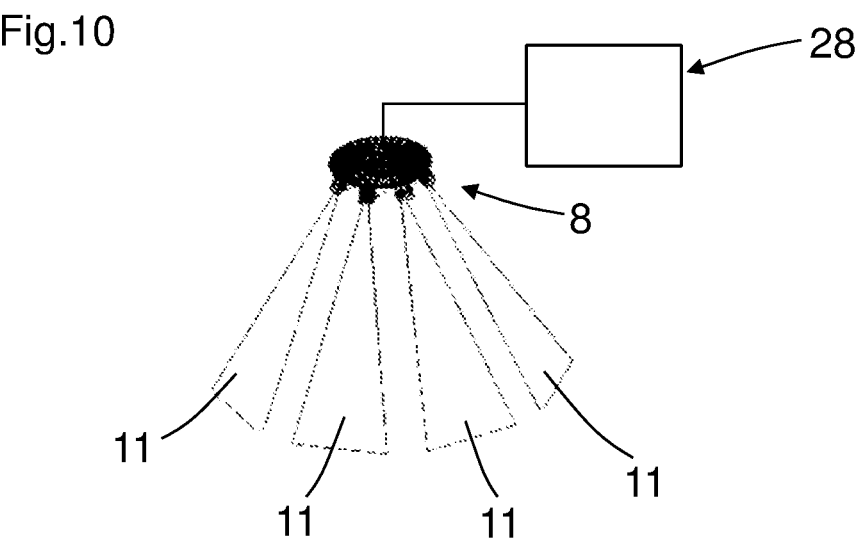

The invention will also be explained in the following with respect to further advantages and features with reference to the enclosed drawing and to embodiments. The Figures of the drawing show in:

FIG. 1 a system having a sensor system having a first fastening adapter;

FIG. 2 a system having a sensor system having a second fastening adapter;

FIGS. 3 and 4 respectively a second fastening adapter;

FIGS. 5 and 6 respectively a first fastening adapter;

FIG. 7 a respective holder with distance sensors;

FIG. 8 a sensor system comprising a protected shell field and a warning shell field; and FIGS. 9 and 10 in each case a sensor system with a protected shell field.

In the following Figures, identical parts are provided with identical reference numerals.

FIG. 1 shows a system 1 having a sensor system 2 comprising distance sensors 8 for monitoring a hazardous zone at a movable machine part 5 having at least one protected zone 6, wherein a tool 7 is arranged at the movable machine part 5, wherein the distance sensors 8 are arranged at a holder 9, wherein a plurality of distance sensors 8 are arranged, with the detection beams of the distance sensors 8 forming a protected field shell 11, wherein the holder 9 has the distance sensors 8, with the holder 9 having a disk-shaped housing 12, with the disk-shaped housing 12 having round surfaces 13 and not having any corners at the outer surfaces, with the system 1 comprising a fastening system 14, wherein the fastening system 14 comprises a first fastening adapter 15 at which the holder 9 is arranged for fastening the holder 9 to the tool 7, and wherein the first fastening adapter 15 has a central continuous opening 20 for the tool 7.

FIG. 2 shows a system 1 having a sensor system 2 comprising distance sensors 8 for monitoring a hazardous zone at a movable machine part 5 having at least one protected zone 6, wherein a tool 7 is arranged at the movable machine part 5, wherein the distance sensors S are arranged at a holder 9, wherein a plurality of distance sensors 8 are arranged, with the detection beams 10 of the distance sensors 8 forming a protected field shell 11, wherein the holder 9 has the distance sensors 8, with the holder 9 having a disk-shaped housing 12, with the disk-shaped housing 12 having round surfaces 13 and not having any corners at the outer surfaces, with the system 1 comprising a fastening system 14, wherein the fastening system 14 comprises a second fastening adapter 16 at which the holder 9 is arranged for fastening the holder 9 to the movable machine part 5, with the second fastening adapter 16 having two limbs 23, 24 that are arranged at a right angle to one another, and with the holder 9 being fastened to the first limb 23 and the second fastening adapter 16 being connected to the movable machine part 5 at the second limb 24.

The fastening system 14 is preferably fixed to the last axis of a robot. The fastening system 14 thus has a defined orientation or a defined angle with respect to the last axis.

A longitudinal axis of the tool 7 is preferably arranged at an angle of 90° to a last axis of the movable machine part 5.

The disk-shaped housing 12 has round surfaces and no corners at the outer surfaces.

Due to the round surface 13 of the disk-shaped housing 12, a possible collision surface is present at every point and actually no collision edge or collision corner, whereby a risk of injury is minimized. The outer contours of the disk-shaped housing are here optionally rounded, also circular or arcuate. The system does not have any sharp edges.

The holder 9 that receives the distance sensors 8 can be monolithic or modular.

The holder 9 and the mount for the distance sensors 8 are fixedly connected to the fastening adapters 15, 16 so that they do not release from the fastening adapters 15, 16 on a blow between the human and the holder 9.

The sensor system 2 serves for the safe monitoring of the hazardous zone or of a monitored zone of the movable machine part 5.

The control and evaluation unit 28 recognizes protected field shell infringements and can output a safety directed switch-off signal to stop a dangerous movement of the movable machine part 5 or to brake the part. This can e.g. be implemented via safe switching signals e.g. OSSD signals (output safety switching device signals) or safe distance data, spacing data or safe spatial data of the intrusion event. For example, the control and evaluation unit 28 is configured with two channels.

The plurality of distance sensors 8 are connected to the control and evaluation unit 28 for evaluating the distance sensors 8.

The distance sensors 8 are optionally arranged spaced from one another along a ring, with the distance sensors 8 forming an areal protected field shell 11 that extends, for example, cylindrically or frustoconically.

The distance sensors 8 optionally have uniform spacings. An almost uniform resolution within the protected field is achieved by the uniform spacings of the sensors 8 and a respective identical angular orientation of the detection beams 10.

The distance sensors 8 are contactlessly acting distance measuring sensors 8, with the distance sensors 8 having a detection beam for detecting objects in the monitored zone. The distance sensors 8 are preferably optoelectronic distance sensors 8.

The distance sensors 8 can each have a linear or areal protected field. The areal protected field is formed in fan shape with a specific opening angle of, for example, 2° to 20°.

The monitoring takes place optionally using a plurality of simple distance measurement sensors sensing in one dimension.

The distance sensors 8 are time of flight sensors, for example.

A modular design of the holder 9 is likewise provided. A submodule of the holder 9 here only includes a limited number of distance sensors 8. Any desired securing contours can thus be produced by a combination of different submodules.

An adaptation of the number of sensors is provided to generate a more or less closed protected field shell 11 from the distance sensors 8: The number of sensors can be changed, for example. The more distance sensors 8 are arranged, the closer the optical axes of the distance sensors are 8 next to one another, whereby the protected field shell has a higher resolution.

Mounts of the holder 9 for the distance sensors 8 optionally have at least one mechanical fastening for the distance sensors at which the distance sensors 8 can be mounted in at least one predefined position.

The holder 9 or a mount in the holder 9 is implemented such that all the distance sensors 8 have a fixed relative position with respect to one another that is compatible with the securing concept.

The mount is optionally implemented such that a plurality of orientations of the individual distance sensors 8 are possible that are each compatible with the securing concept.

The fastening system 14 is configured such that no manipulation is possible due to the fastening mechanism. I.e. the holder 9 has to be installed first, then the tool 7. The fastening system 14 is designed such that the holder 9 can only be removed after dismantling the tool 7.

The fastening system 14 is configured such that the tool 7 is vertically adjustable relative to the holder 9 or to the EOAS. The protected field shell 11 can thereby always be adapted to the application and to the dimensions of the tool 7.

The fastening system 14 is designed such that the tool 7 can be easily replaced. This can preferably also be done in ongoing operation.

The fastening system 14 is designed such that the tool 7 does not slide in position and location after installation since the position of the tool length to the protected field shell 11 has to remain ensured.

The fastening system 14 is configured such that a strain relief of cables and lines is provided at the fastening system.

In accordance with FIG. 3 and FIG. 4, the second fastening adapter 16 is screwed to the holder 9 by means of a single screw connection 19, with the screw connection 19 having a diameter that is greater than the central continuous opening 20 for the tool 7.

Since the diameter has a size that is greater than the central continuous opening for the tool 7, the screw connection 19 can surround the central opening 20 and the screw connection 19 can, for example, be released and fastened or fixed by the hand alone.

In accordance with FIGS. 5 and 6, the first fastening adapter 15 has an annular fastening unit 21, with the annular fastening unit 21 surrounding or encompassing the central opening 20 and with fastening means being symmetrically arranged at the annular fastening unit 21.

A central axis of the first fastening adapter 15 can thereby be arranged congruent with a central axis of the tool 7. The tool 7 is here arranged centrally to the first fastening adapter 15 and centrally to the holder 9.

In accordance with FIGS. 3 and 4, the first limb 23 of the second fastening adapter 16 has an opening for the tool 7.

A central axis of the opening of the first limb 23 of the second fastening adapter 16 can thereby be arranged congruent with a central axis of the tool 7. The tool 7 is here arranged centrally to the opening of the first limb 23 of the second fastening adapter 16 and centrally to the holder 9.

In accordance with FIGS. 3 and 4, the first limb 23 and the second limb 24 each have fastening holes.

The holder 9 can thereby be easily fastened to the first limb 23, for example by means of installation screws, and the second limb 24 of the second fastening adapter 16 can, for example, be connected to the movable machine part 5 by means of installation screws.

In accordance with FIGS. 3 and 4, the first limb 23 and the second limb 24 are each round at the ends.

Due to the round surface of the ends, no sharp edges or corners are present, whereby a risk of injury is minimized. The outer contours of the limbs 23, 24 are here optionally circular or arcuate.

In accordance with an embodiment that is not shown, a material supply device is arranged at and fastened to the fastening system 14.

The fastening system 14 is configured such that applications can be implemented with and output a supply of installation parts. In screw applications, it may e.g. occur that screws are delivered to the installation site by a supply along the tool 7, for example along a screw tool.

The fastening system 14 is configured such that the supply does not impair or shadow the protected field shell 11. The material supply device is here, for example, guided within the holder 9, that is, not by the protected field shell 11, or the material supply device is guided between two detection beams 10 close to the origin of the detection beams 10, whereby the protected field shell 11 is likewise not impaired or shadowed.

In accordance with FIG. 2, the tool is an installation tool 27, a screw tool, a bonding tool, a cleaning tool, a drilling tool, a milling tool, a grinding tool, or a deburring tool.

FIG. 7 shows the arrangement of the distance sensors in different holders 9.

In accordance with FIG. 8, the system 1 comprises the control and evaluation unit 28, with the distance sensors 8 being connected to the control and evaluation unit 28, with first detection beams of the distance sensors 8 forming the protected field shell 11 and second detection beams of the distance sensors 8 forming a warning field shell 31, with the warning field shell 31 sheathing the protected field shell 11.

The outer warning field shell 31 results in a weaker safety measure on an intervention such as an alarm or a certain reduction of speed and only the inner protected field shell 11 acts as a protected field with a genuine safeguarding by stopping, evading, or by a great reduction of the speed of the tool 7.

In accordance with FIG. 8, the control and evaluation unit 28 is configured to vary a movement speed of the movable machine part, 5 with the movement speed 31 being slowed on an intervention in the warning field shell 31 and being stopped on an intervention in the protected field shell 11.

In accordance with FIG. 9, the control and evaluation unit 28 is configured to only activate the tool 7 when a minimum distance is present between the tool 7 and a workpiece, with the minimum distance amounting to 14 mm.

The system 1 or the control and evaluation unit 28 is configured for the purpose that the protected field shell 11 is configured such that on an approach to a process point, for example the point at which the screw is installed, the movable machine part 5 or the robot becomes slower on an intervention in the warning field shell 31 or stops on an intervention in the protected field shell 11.

The system or the control and evaluation unit 28 is configured for the purpose that the protected field shell is configured such that the tool 7 and the robot are switched off or stopped in the case of an intervention. The tools 7 are in particular only actuated (e.g. rotating the screw head/drill or the deburrer, actuating the adhesive nozzle, etc.) when the distance between the tool tip and the surface to be machined is smaller than a minimum distance.

REFERENCE NUMERALS 1 system
2 sensor system
5 movable machine part
6 protected zone
7 tool
8 distance sensors
9 holder
10 detection beams
11 protected field shell
12 disk-shaped housing
13 round surfaces
14 fastening system
15 first fastening adapter
16 second fastening adapter
19 screw connection
20 central continuous opening
21 annular fastening unit
22 fastening means
23 first limb
24 second limb
25 fastening holes
27 installation tool
28 control and evaluation unit
29 first detection beams
30 second detection beams
31 warning field shell

The invention claimed is:

1. A system having a sensor system comprising distance sensors and a control and evaluation unit for monitoring a hazardous zone at a movable machine part having at least one protected zone, wherein a tool is arranged at the movable machine part,
   wherein the distance sensors are arranged at a holder;
   wherein a plurality of distance sensors are arranged; with the detection beams of the distance sensors forming a protected field shell;
   wherein the holder has the distance sensors, with the holder having a disk-shaped housing, with the disk-shaped housing having round surfaces and not having any corners at the outer surfaces, with the system comprising a fastening system,
   wherein the fastening system comprises a second fastening adapter at which the holder is arranged for fastening the holder to the movable machine part, with the second fastening adapter having two limbs that are arranged at a right angle to one another, with the holder being fastened to the first limb and with the second fastening adapter being connected to the movable machine part at the second limb, and
   wherein the second fastening adapter is screwed to the holder by means of a single screw connection, with the screw connection having a diameter that is greater than the central continuous opening for the tool.

2. The system in accordance with claim 1, wherein the first limb of the second fastening adapter has an opening for the tool.

3. The system in accordance with claim 1, wherein the first limb and the second limb each have fastening holes.

4. The system in accordance with claim 1, wherein the first limb and the second limb are each formed as round at the ends.

5. The system in accordance with claim 1, wherein the tool is one of an installation tool, a screw tool, a bonding tool, a cleaning tool, a drilling tool, a milling tool, a grinding tool, and a deburring tool.

6. The system in accordance with claim 1, wherein the system comprises the control and evaluation unit, with the distance sensors being connected to the control and evaluation unit, with first detection beams of the distance sensors forming the protected field shell and second detection beams of the distance sensors forming a warning field shell, with the warning field shell sheathing the protected field shell.

7. The system in accordance with claim 1, wherein the control and evaluation unit is configured to vary a movement speed of the movable machine part, with the movement speed being slowed on an intervention in the warning field shell and being stopped on an intervention in the protected field shell.

8. The system in accordance with claim 1, wherein the control and evaluation unit is configured to only activate the tool when a minimum distance is present between the tool and a work-piece, with the minimum distance being based on anthropometric data.

9. The system in accordance with claim 1, wherein the control and evaluation unit is configured to only activate the tool when a minimum distance is present between the tool and a workpiece, with the minimum distance amounting to 10 mm to 20 mm.

10. The system in accordance with claim 1, wherein the control and evaluation unit is configured to only activate the tool when a minimum distance is present between the tool and a workpiece, with the minimum distance amounting to 14 mm.

* * * * *